O. OEHRING.
APPARATUS FOR STAMPING LETTERS AND DELIVERING RECEIPTS FOR THE SAME.
APPLICATION FILED DEC. 17, 1909.

995,631.

Patented June 20, 1911.

6 SHEETS—SHEET 1.

Witnesses:

Inventor:
Oscar Oehring

O. OEHRING.
APPARATUS FOR STAMPING LETTERS AND DELIVERING RECEIPTS FOR THE SAME.
APPLICATION FILED DEC. 17, 1909.

995,631.

Patented June 20, 1911.

6 SHEETS—SHEET 2.

O. OEHRING.
APPARATUS FOR STAMPING LETTERS AND DELIVERING RECEIPTS FOR THE SAME.
APPLICATION FILED DEC. 17, 1909.
995,631.
Patented June 20, 1911.
6 SHEETS—SHEET 3.
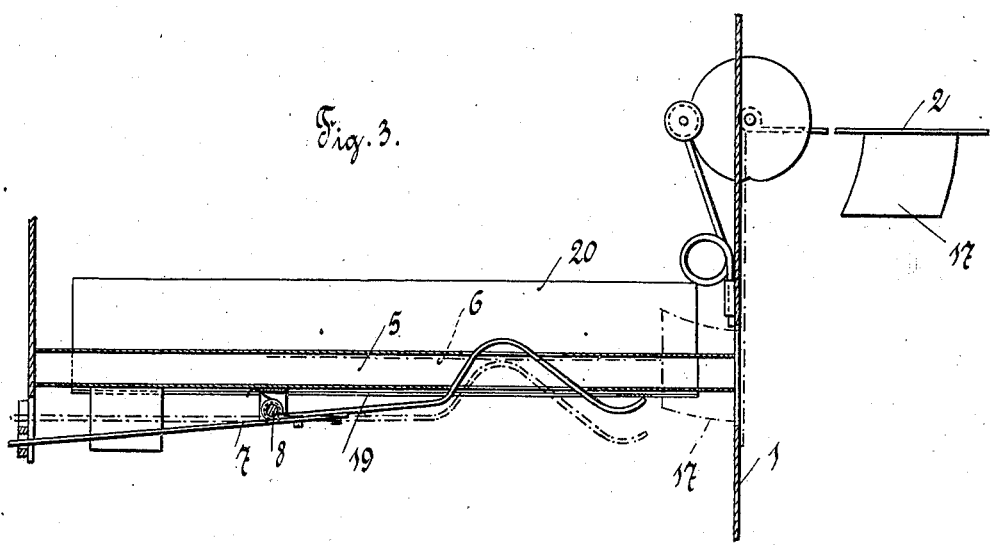
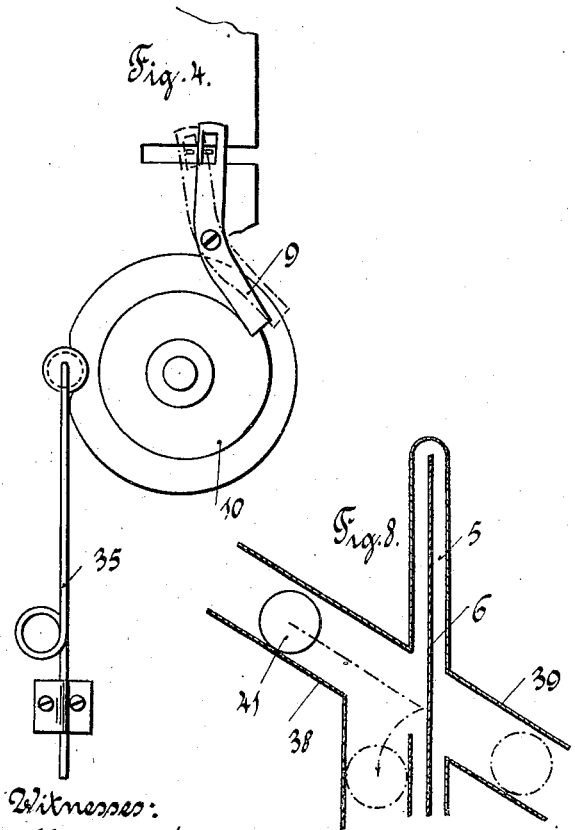
Witnesses:
Inventor:
Oscar Oehring
By Emil Bönnelycke
Atty O. OEHRING.
APPARATUS FOR STAMPING LETTERS AND DELIVERING RECEIPTS FOR THE SAME.
APPLICATION FILED DEC. 17, 1909.
995,631.
Patented June 20, 1911.
6 SHEETS—SHEET 4.
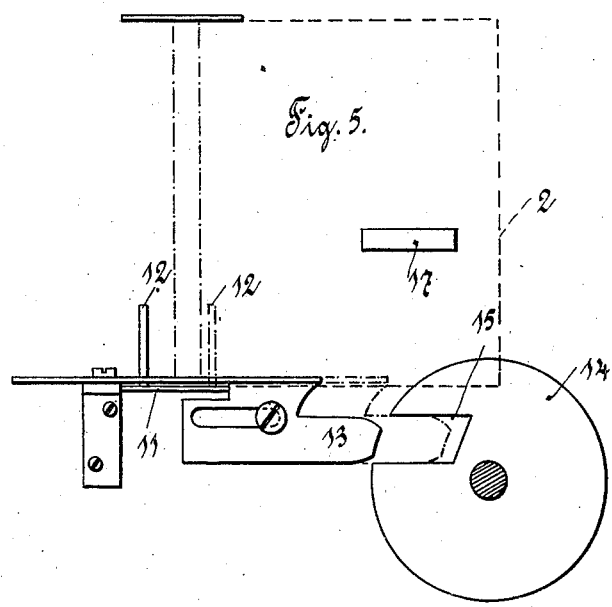
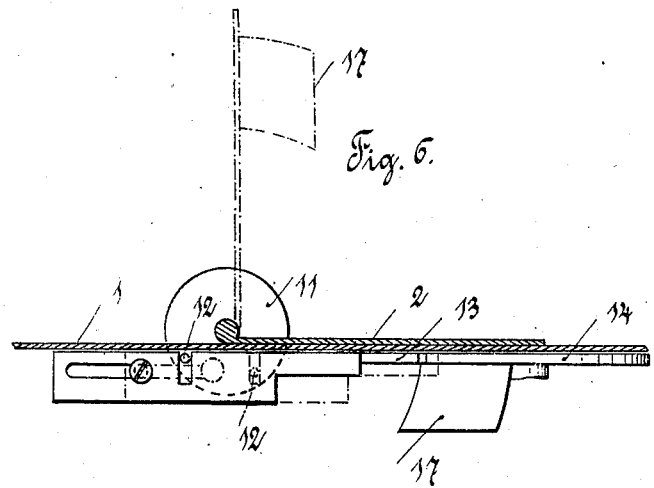
Witnesses:
Inventor:
Oscar Oehring O. OEHRING.
APPARATUS FOR STAMPING LETTERS AND DELIVERING RECEIPTS FOR THE SAME.
APPLICATION FILED DEC. 17, 1909.
995,631.
Patented June 20, 1911.
6 SHEETS—SHEET 5.
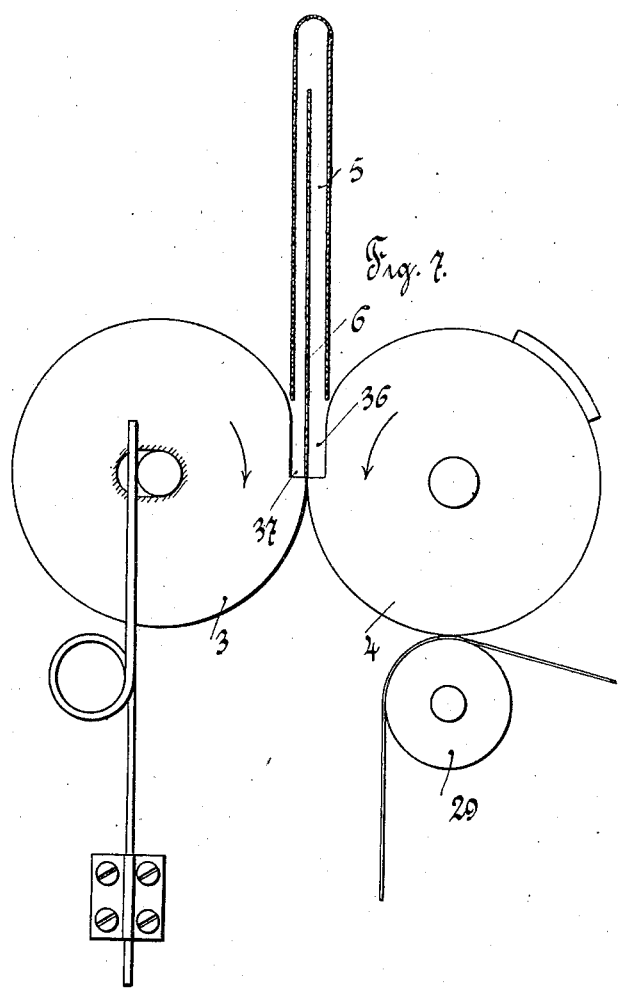
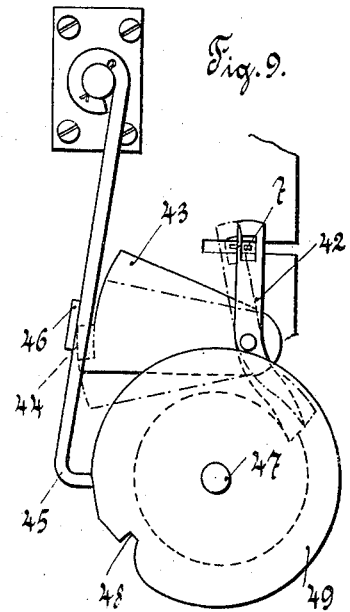
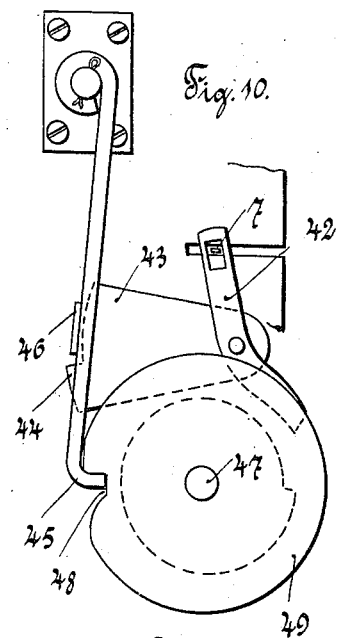
Witnesses:
Inventor:
Oscar Oehring
Atty

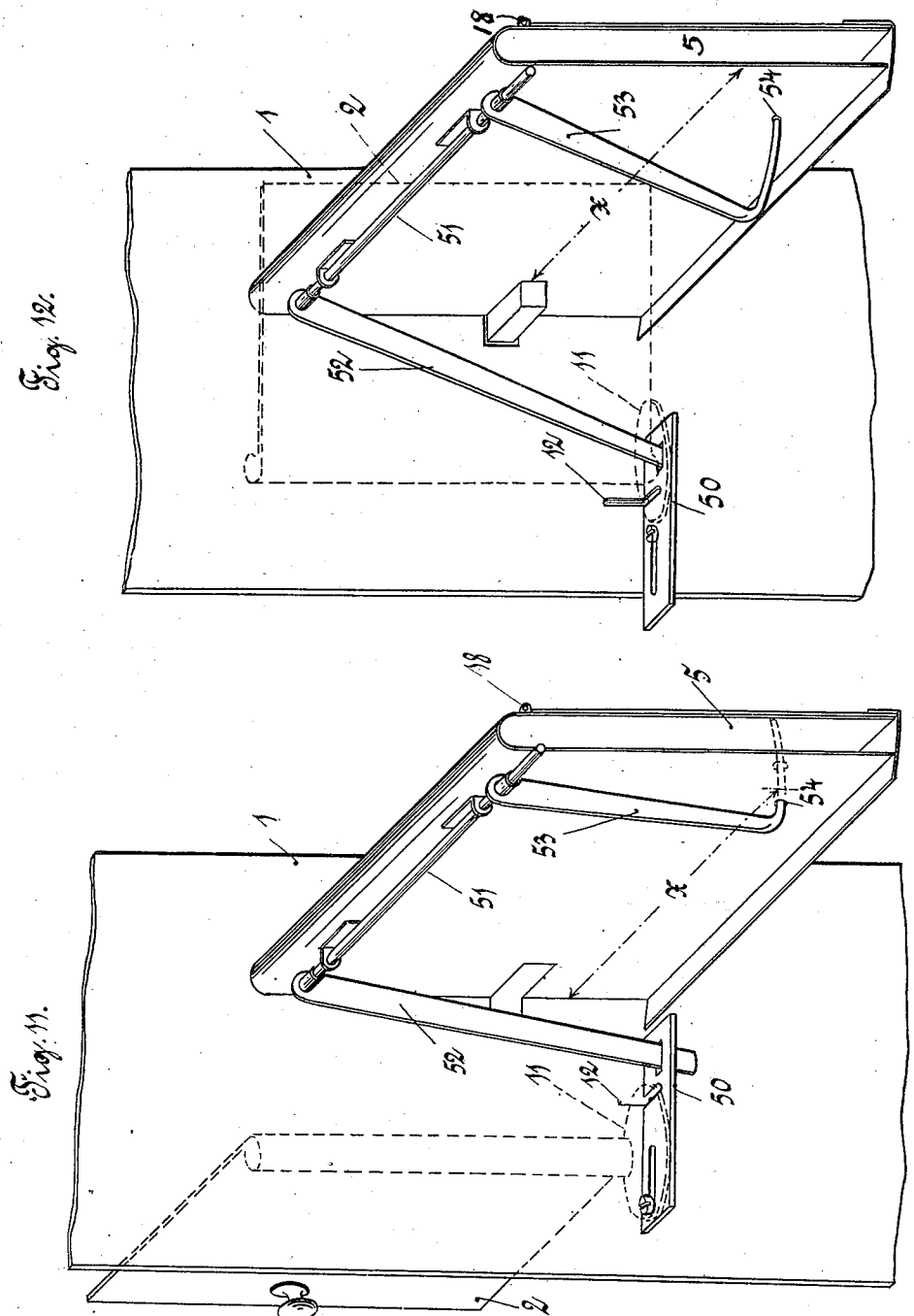

UNITED STATES PATENT OFFICE.

OSCAR OEHRING, OF BERLIN, GERMANY, ASSIGNOR TO AMERICAN STAMP AND TICKET VENDING MACHINE COMPANY, OF NEW YORK, N. Y., A CORPORATION OF NEW JERSEY.

APPARATUS FOR STAMPING LETTERS AND DELIVERING RECEIPTS FOR THE SAME.

995,631.        Specification of Letters Patent.    Patented June 20, 1911.

Application filed December 17, 1909. Serial No. 533,661.

*To all whom it may concern:*

Be it known that I, OSCAR OEHRING, manager, a subject of the German Emperor, residing at Berlin, German Empire, have invented certain new and useful Improvements in Apparatus for Stamping Letters and Delivering Receipts for the Same, of which the following is a specification.

This invention relates to an apparatus for stamping letters, for example registered letters, with a registration mark and likewise for printing a duplicate mark on a receipt which is delivered by the apparatus to the person who deposits the letter as a proof of the letter having been posted. The apparatus can be worked by hand or automatically.

In the accompanying drawings one form of the apparatus is illustrated.

Figure 1:
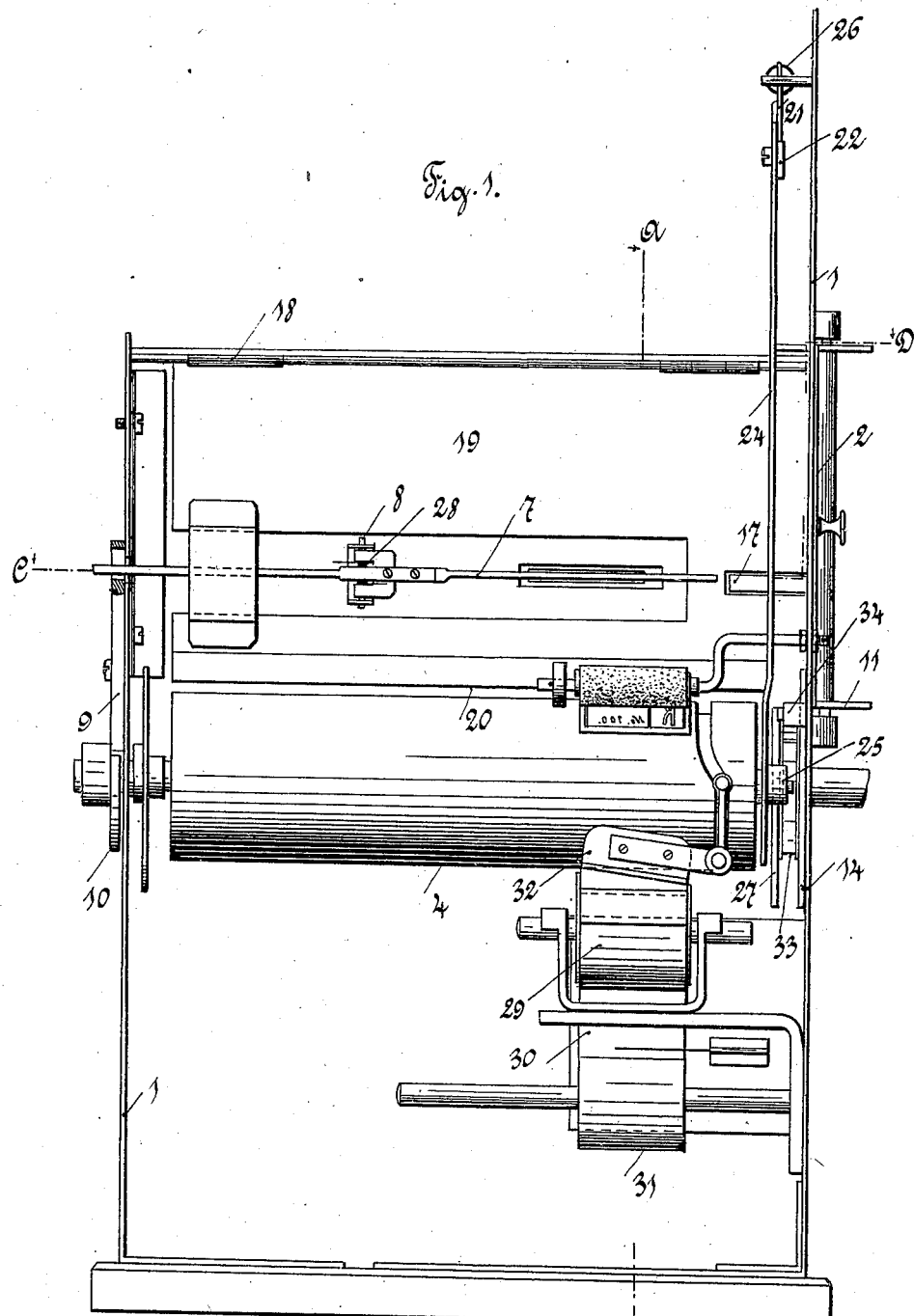
Figure 2:
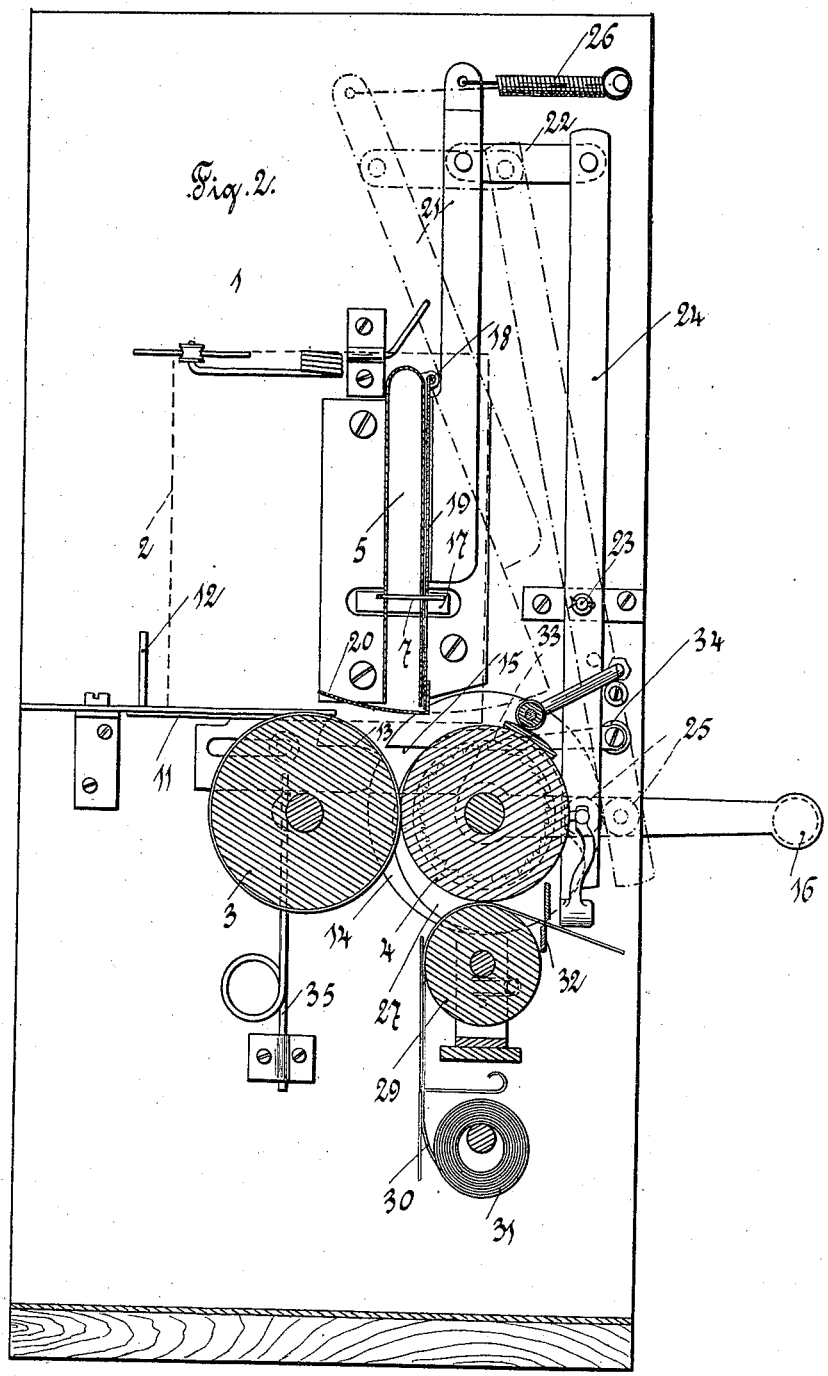

Figure 1 is a front elevation of the interior of the apparatus; Fig. 2, a section through A—B in Fig. 1; Fig. 3, a section through C—D in Fig. 1; Fig. 4, an end elevation of the locking device for the printing block roller; Fig. 5, a view of the locking device for the printing block roller actuated by the door; Fig. 6, a plan view of the mechanism shown in Fig. 5; Fig. 7, an elevation showing a modified form of the feed and printing rollers; Fig. 8, a detail view of the letter holding chamber combined with the chute of a coin controlling mechanism; Fig. 9, an elevation of a locking device in the position of rest, for locking the apparatus in case a letter becomes jammed in the receiver; Fig. 10, a similar view of the same device in the locking position; Figs. 11 and 12 illustrate a device for preventing the introduction into the apparatus of a letter exceeding a certain length, Fig. 11 showing the device with the door of the receiver open and Fig. 12 the device with the door closed.

In a casing 1 which has a side opening for introducing letters, etc., that can be closed by a door 2, rollers 3 and 4 are journaled. The roller 4 serves as a carrier for the block employed for printing the registration mark, and, if desired, may have other blocks besides that for indicating the registration, for example, a date stamp. In the example illustrated the registration stamp consists of a block bearing the letter R recognized internationally for registration purposes, and in addition, if desired, the number of the post office, the name of the place where the posting is effected and a number which is consecutive and is altered each time a letter, etc., is posted. The moving of the number as well as the changing of the date are effected in the known manner and do not need to be explained in detail. The other roller 3 acts as counter pressure roller for the printing block roller 4.

Through the side opening provided with door 2 the letter is pushed into a chamber 5 situated in the casing 1, above the rollers 3, 4, where it strikes a lever 7 which is thereby swung around its pivot 8 and raises a pawl 9 out of a ratchet wheel 10 which is mounted on the shaft of the roller 4 thereby releasing the printing roller. A second locking device is arranged to lock the rollers as long as the door 2 remains open. In the example illustrated this second locking device is arranged as follows: Concentric with the pivot of the door is a disk 11, one part of which passes through the side of the casing into the interior of the apparatus. Here the disk has a pin 12 which engages in a slot formed in a bolt 13 that runs horizontally, so that when the pin 12 is moved to and fro through the opening and closing of the door the bolt is correspondingly moved. On the shaft of the roller 4 is a locking disk 14, provided with a recess 15, normally in position to receive the bolt 13 upon the opening of the door 2. When the door is closed, the bolt is clear of the recess, and the rolls are free to rotate. The end of the bolt 13 abuts against the periphery of the disk 14 during such rotation and prevents the opening of the door 2 until the apparatus is returned to its normal position. The door has further a projection 17, which, when the door is closed, enters the chamber 5 for the letters, and moves the letter or package which may be therein into position to receive the registration stamp when the rollers 3 and 4 are rotated.

The chamber 5 for the letters or other article to be registered in the example illustrated consists of an oblong receptacle, the narrow bottom of which is situated immediately above the contacting peripheries of the two rollers. One side of this receptacle is firmly connected with the casing, while the opposite side 19 is movable on a hinge 18. This movable side is furnished at the bottom with a bent strip 20 which forms the bottom of the chamber 5. The movable side or flap 19 is provided with an arm 21 the free end of which is flexibly connected by means of an intermediate piece 22, with a lever 24 that is movable on a pin 23. The free end of this lever carries a roller 25, which by means of a spring 26 that engages with the upper end of the arm 21, is pressed against a cam 27 fixed on the shaft of the printing block roller 4. If now the printing block roller, which in consequence of the insertion of the registered letter or the like and the closing of the door is no longer locked, be rotated, the roller 25, riding on the cam 27, actuates the lever 24 and thereby the arm 21 and the movable flap 19 of the chamber 5 in such manner that the bent strip 20 which forms the bottom of the chamber 5 is swung from under the chamber. The lever 7 has a bend or loop formed in its length which extends into the chamber 5 through a slot in the flap 19 for the purpose of temporarily supporting a letter or the like by pressing it against the wall of said chamber. The free forward end of the lever 5 bears on the flap 19 so that when the latter is actuated, the lever 7 is also turned on its pivot and releases any letter or package which it may be supporting and permits said letter to drop between the rollers 3, 4. When the letter or the like is drawn through by the rotating rollers, the printing blocks mark the letter with such impressions as are demanded. As is seen from Fig. 7 the rollers 3, 4 may be formed with recesses 36, 37, which when the rollers are in the position of rest form together a cavity into which the lower end of the letter falls. Hereby through the rotation of the rollers the letter is conveyed reliably and in the proper position between the rollers.

In order that it may be possible to deliver to the person who posted the letter or the like an automatically produced certificate of the posting, the following device is adopted. Adjoining or underneath the printing block roller 4, parallel to the letter, a conveying roller is rotatively mounted, which is suitably covered with india rubber or some other flexible material. The conveying roller 29 is pressed by springs or otherwise against the printing block roller so that when the latter is rotated the printing block comes in contact with the conveying roller. Over the latter runs a strip of paper 30 which comes from a supply roller 31. When a letter has been printed by means of the printing block, and before the printing block roller returns to its normal position an impression is made on the strip of paper 30 by the printing block and the strip is simultaneously moved forward by the printing block roller 4 and the conveying roller a distance equal to the perimeter of the roller 4. A cutting device 32 actuated after the roller 4 completes its rotation, then cuts off the portion of the strip furnished with the same registration mark as the letter, this portion passing out through a delivery chute to be taken away by the person who posted the letter. In order to prevent improper use, the turning back of the printing block roller is prevented by the provision of a locking device which consists of a ratchet wheel 33, mounted on the shaft of the printing block roller and a pawl 34 that engages therewith.

The bearings of the roller 3 slide in slots under pressure of springs 35 to permit letters of different thicknesses passing between the rollers 3 and 4.

The apparatus described in the embodiment of the invention illustrated is so constructed that it can be actuated by any person through the opening of the door, the pushing in of the letter, and the subsequent closing of the door and rotating of the crank. The apparatus may, however, be so constructed that the mechanism can only be actuated after a coin has been inserted. The devices required for the purpose are of a known kind and could be combined with the apparatus without difficulty by any expert. In case the apparatus be actuated by the introduction of a coin the variation as illustrated in Fig. 8, may be adopted. On one side of the chamber 5 serving for the reception of the letter is an opening 38 for the introduction of the coin. On the other side of the chamber 5 this passage 38 has an extension 39. In front of the chamber 5 the passage 38 has in addition a downwardly directed branch passage 40. If there is a letter in the chamber 5, a coin 41 put in through the slot 38 rolls down from the letter and drops into the passage 40, releasing the motor which actuates the above described mechanism. If there be no letter the coin falls transversely through the chamber, into the passage 39, through which it is carried out of the apparatus.

For the purpose of preventing the apparatus from being worked when a letter that has been pushed in is prevented for any any reason from falling between the printing rollers, the locking apparatus shown in Figs. 9 and 10 and actuated by the letter itself is provided. In these figures it will be observed that the pawl 9, operated by the lever 7, is mounted on a pivot 42 and rigid with an arm 43 formed with a projection 44. In front of the arm 43 a pawl 45 provided with a plate 46 is movably suspended. If there be no letter in the receiver, the lever 7 assumes the position shown by fully drawn lines in Fig. 9. The projection 44 on the lever 48 is thus held in such a position that the plate 46 of the pawl is supported on it so that the printing roller mounted on the shaft 47 can be rotated. If, on the contrary, a letter is jammed in the receptacle, the lever 7 is moved into the position indicated in Fig. 10 and actuates the arm 43, so that the projection 44 no longer lies within range of the plate 46. Thus when the printing roller is rotated the pawl 45 can drop into a recess 48 in the disk 49 fixed on the shaft 47 and thereby prevent the rotation of the rollers and the further actuating of the apparatus, the result of which is that the taking away of receipts, which in the absence of this locking device could be printed and taken away in any number in consequence of the jamming of the letter is made impossible. It may moreover easily happen that the length of the letter or the like pushed into the receptacle is greater than the space between the part of the door that pushes the letter into the receptacle and the back of the receptacle, in which case the letter is jammed by the door extension and firmly held in the receptacle, so that it cannot be stamped but on the other hand a number of receipts can be printed and taken out. The device illustrated in Figs. 11 and 12 is intended to prevent this. The pin 12 on the disk 11, heretofore described, engages with a slide 50 and moves it to or from the receptacle 5, when the door is opened or closed. When the door is opened, see Fig. 11, the slide 50 is brought nearer the receptacle 5 and swings in the same direction an arm 52 mounted on a shaft 51 journaled on said receptacle. A second arm 53 extends downwardly from the shaft 51 and has its lower end bent inwardly and in the position shown in Fig. 11, passes through a hole 54 into the receptacle. If now a letter be put into the letter receptacle through the opening freed by the door 2, the end pushed in will abut against the hook or bent end of the arm 53. The distance indicated in the drawing as $x$ between said hook end of the arm 53 and the inlet opening in the receptacle 5 is equal to the distance from the back of the chamber or receptacle 5 to the projection 17 on the door when the latter is closed. If the door 2 now be closed, Fig. 12, the pin 12 moves the door plate so that the arm 52 swings away from the letter receptacle 5, thus causing the hook shaped end of the lever 53 to withdraw from the receptacle 5, so that the letter can be pushed completely into the letter receptacle by the door extension 17 as it enters the front of the receptacle.

What I claim and desire to secure by Letters Patent is:

1. In an apparatus of the class described, a letter receptacle having an open bottom, letter clamping means in said receptacle, a movable closure for the open bottom of the receptacle, a pair of rollers below the receptacle in yielding contact, one of said rollers carrying a printing block, means for rotating said rollers, and means on the printing roller to actuate mechanism for uncovering said receptacle and loosen said letter clamp whereby said letter is permitted to drop between the rollers and be stamped by the printing block.

2. In an apparatus of the class described, a letter receptacle having an open bottom and an open end, letter clamping means in said receptacle, a door for closing the end of the receptacle, a movable closure for the open bottom of the same, a pair of rollers in yielding contact below said receptacle, one of said rollers carrying a printing block, means for rotating said rollers, means on the printing roller to actuate mechanism for uncovering said receptacle and loosen said letter clamp, whereby said letter is permitted to drop between the rollers and be stamped by the printing block, and a lock operated when the aforesaid door is opened to prevent the rollers being turned until said door is closed.

3. In an apparatus of the class described, a letter receptacle having an open bottom and an open end, a door for closing said open end, means for retaining a letter in said receptacle after being placed therein until the door is fully closed, a printing roller below said receptacle and means for rotating the same, and a lock actuated by the door upon opening the same for preventing rotation of the printing roll until the door is closed.

4. In an apparatus of the class described, a letter receptacle having an open bottom and an open end, means for retaining a letter in said receptacle after being placed therein until the door is fully closed, a movable closure for the bottom of the receptacle, a printing roller below the same and means for rotating said printing roller, and operating means actuated when the printing roller is turned for withdrawing the closure and releasing the letter retaining means to permit said letter to escape from the receptacle.

5. In an apparatus of the class described, a letter receptacle having an open bottom and an open end, a door for closing said open end, means for temporarily retaining a letter in said receptacle, a movable closure for the bottom of the receptacle, a printing roller and a pressure roller below the same, and means for rotating said rollers, a lock actuated by the door upon opening for preventing movement of the printing roll, and a cam on the printing roller for moving the closure at the bottom of the receptacle and releasing the letter retaining means.

6. In an apparatus of the class described, a letter receptacle having an open bottom and an open end, a door for closing said open end, means for temporarily retaining a letter in said receptacle, a swinging closure for the bottom of the receptacle, a printing roller below the closure, means for rotating said roller, and a cam on the printing roller shaft for removing the closure from beneath the receptacle, said movement of the closure operating the letter retaining means to release a letter.

7. In an apparatus of the class described, a letter receptacle having an open bottom and an open end, a door for closing said open end, a movable closure for the bottom of the receptacle, a printing mechanism below the receptacle, a locking device for preventing movement of the printing mechanism when said door is open, means for operating the printing mechanism and withdrawing said closure from the bottom of the receptacle, means for feeding a strip to the printing mechanism to receive an impression after the letter has been impressed, and means for severing said printed portion of the strip to form a receipt.

8. In an apparatus of the class described, a letter receptacle having an open bottom and an open end, a door for closing said open end, a movable closure for the bottom of the receptacle, a printing mechanism below the receptacle, means for operating the printing mechanism, and means actuated by the printing mechanism for withdrawing the closure from beneath the receptacle to permit a letter entering said printing mechanism.

9. In an apparatus of the class described, a letter receptacle having an open bottom and an open end, a door for closing said open end, a movable closure for the bottom of the receptacle, a printing mechanism below the receptacle, a locking device for preventing movement of the printing mechanism when the door is open, means for operating the printing mechanism, and means actuated by the printing mechanism for withdrawing the closure from beneath the receptacle to permit a letter entering said printing mechanism.

10. In an apparatus of the class described, a letter receptacle having an opening for the introduction of a letter thereinto, means for temporarily retaining a letter in said receptacle, said means adapted to be actuated by the insertion of a letter in the receptacle, a printing mechanism below the receptacle, means for operating the printing mechanism, and instrumentalities operated by the retaining means to lock said printing mechanism and prevent its operation when an object of excess size is placed in the receptacle.

11. In an apparatus of the class described, a letter receptacle having openings respectively for the insertion thereinto and escape therefrom of registrable matter, a door for closing the insertion opening, a projection on said door adapted to enter the receptacle when the door is closed, a stop for temporarily limiting the distance said registrable matter can be pushed into said receptacle, and means actuated by the movement of the door for projecting said stop into the path of the registrable matter when the door is opened, and withdrawing it when the door is closed.

In testimony whereof I affix my signature in presence of two witnesses.

OSCAR OEHRING.

Witnesses:
 WOLDEMAR HAUPT,
 HENRY HASPER.

---

Copies of this patent may be obtained for five cents each, by addressing the "Commissioner of Patents, Washington, D. C."